Aug. 10, 1971    R. GARDNER, JR    3,598,692
THREE LAYER, VINYL CHLORIDE POLYMER, ENERGY-ABSORBING STRUCTURE
Filed April 13, 1967    2 Sheets-Sheet 2
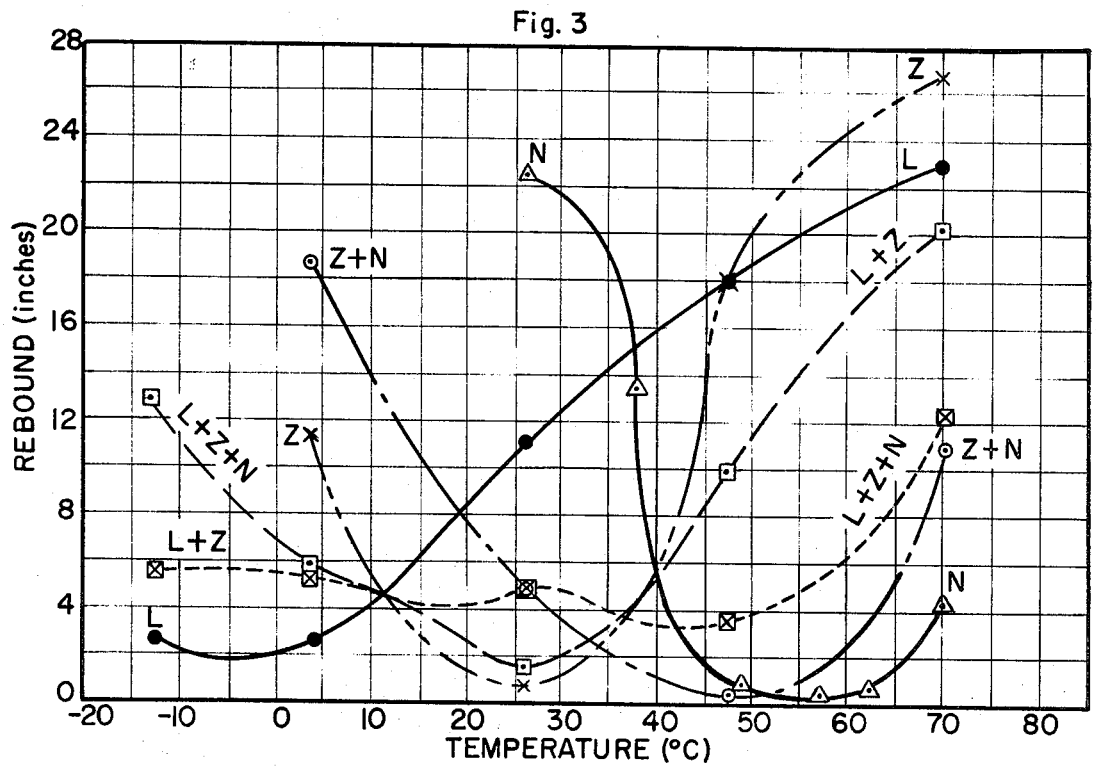
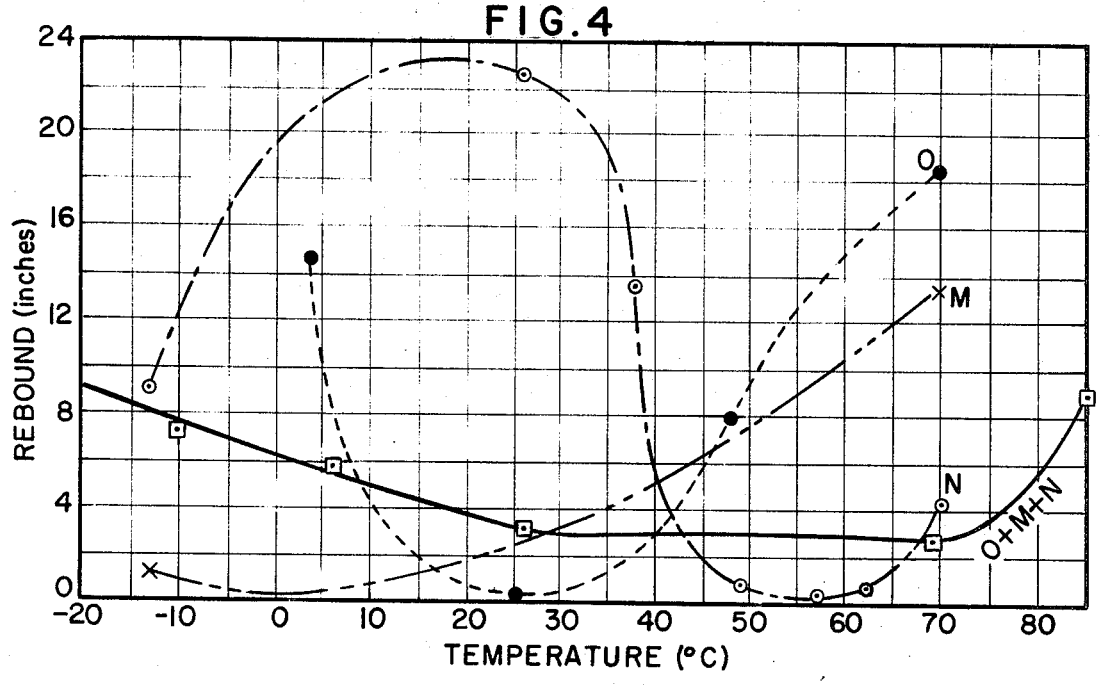

United States Patent Office 3,598,692
Patented Aug. 10, 1971

3,598,692
THREE LAYER, VINYL CHLORIDE POLYMER, ENERGY-ABSORBING STRUCTURE
Ross Gardner, Jr., Stoughton, Mass., assignor to National Research Corporation, Newton Highlands, Mass.
Filed Apr. 13, 1967, Ser. No. 630,609
Int. Cl. B32b 7/02, 7/30; G10k 11/00
U.S. Cl. 161—166                                2 Claims

ABSTRACT OF THE DISCLOSURE

Energy-absorbing material is provided from a number of layers of different energy-absorbing plastic formulations. Each layer preferably comprises a polymeric material and an inert diluent. A number of the layers have rebound minima at different and relatively narrow temperature ranges. The composite material has a rebound minimum covering a substantially wider temperature range than any individual layer.

---

The present invention is particularly directed to energy-absorbing material having ability to absorb energy over a wide temperature range. The absorption of energy in the form of vibration, shock and sound has been the subject of considerable interest for centuries. None of the prior attempts have been completely successful for all purposes. It has generally depended upon absorption of vibration, including sound, in various media, such as rubber, fiberglass, lead, etc.

Accordingly, it is a principal object of the present invention to provide a vibration damping product which has unique properties, good structural strength, formability, relative freedom from cold flow, relatively high impact strength and very high vibration damping characteristics.

Other objects of the invention will in part be obvious and will in part appear hereinafter.

The invention accordingly comprises the product and compositions possessing the features, properties and the relation of components which are exemplified in the following detailed disclosure, and the scope of the application which will be indicated in the claims.

For a fuller understanding of the nature and objects of the invention, reference should be had to the following detailed discussion thereof taken in connection with the accompanying drawings in which:

FIGS. 3 and 4 are graphs showing rebound characteristics of the individual layers in Table I as well as the rebound characteristics of composites formed of these layers.

Figure 1:
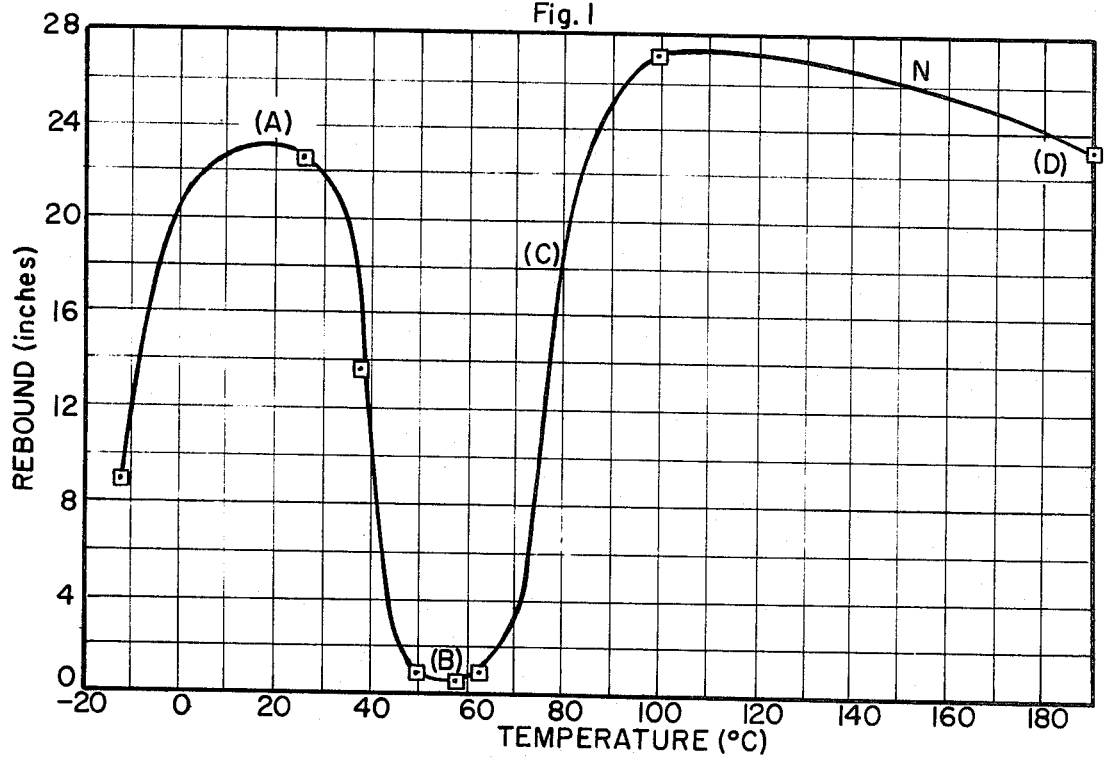
FIG. 1 is a graph showing the rebound characteristics as a function of temperature in a certain polyvinyl chloride plasticizer mixture.

The above properties are achieved in the present invention by providing a unique composite energy-absorbing material comprising a plurality of layers of different energy-absorbing plastic formulations. Each of the layers preferably comprises a polymeric material, and a number of layers have rebound minima at different and narrow temperature ranges, the composite material having a rebound minimum covering a substantially wider range than any individual layer.

In a preferred embodiment at least three layers are employed; one of the layers having a rebound minima at substantially below room temperature; another having a rebound minimum at near room temperature; a third having a rebound minimum at substantially above room temperature. As a result of this combination of layers, the composite product has a very wide Minimum Rebound Temperature range.

I have discovered that, when a laminate is formed by combining layers of energy-absorbing materials, each layer having a minimum rebound at a different temperature, the laminate has low-rebound properties over a wider range than any of the individual layers. In the preferred embodiment of the invention, the individual layers are composed of a polymeric material to which a liquid extender or plasticizing material has been added. While the exact theoretical mechanism of operation of the invention is not conclusively demonstrated, it is believed to be due to the fact that the polymeric material gives a skeletal structure (in most cases believed to be 3-dimensional) containing the liquid extender. As the material is subjected to compression, the liquid will flow within the skeletal structure dissipating energy in the form of heat. If the liquid is too fluid, it flows too fast, it will not absorb an appreciable amount of energy, and the energy will be transmitted through the skeletal polymeric structure. If the liquid is too viscous and flows too slowly, it will act to transmit energy directly through the liquid itself. Of course it must be realized that a liquid is not required in all cases as portions of the polymer network itself may be acting similarly. This is particularly true with polymers having side chains which can, at more elevated temperatures, create high frictional losses as the side chains move within the polymer structure.

This can be summed up as an area of energy absorption known as visco-elasticity, or mechanical energy dissipation in the form of heat due to frictional forces within the composition. These frictional losses can be subdivided into two categories, internal damping and external damping. Internal damping is used to describe losses due to friction caused by a nonstructural portion of the polymer network, i.e. a side chain, while the term external damping is reserved for frictional losses caused by the movement of a secondary liquid (extender) not a part of the polymer chain. Of course, these definitions are oversimplified as under some conditions the side chains or the extender may function as members of the structural polymer network. Nevertheless, the description of a liquid passing through a polymer network functioning as a 3-dimensional network serves in explaining the phenomena encountered.

Preferred forms of the invention utilize cured epoxy polymer, a polyvinyl chloride resin or combinations of cured-epoxy and polyvinyl chloride as the polymer network. It should be realized, however, that many other systems are feasible, and materials such as urethanes, silicones and various natural and synthetic rubbers can form acceptable polymer networks. Materials used as layers within the invention should in no way be limited to those preferred polymers specifically described herein, but should be used only as illustrations of how such layers may be prepared.

The polymeric matrix should be preferably sufficiently cured so that it is not easily subjected to cold flow, but should not be so hard that it has a room temperature Shore A Durometer in excess of 90 when unfilled, e.g. does not contain a solid inert additive such as alumina dust, etc.

Individual energy absorbing layers can be prepared by the selection of a polymer network (a 3-dimensional network being preferred) and adding a compatible liquid, such as a plasticizer, having the proper viscosity or mobility at the temperature for which low-rebound is intended. In FIG. 1 there is plotted a curve useful in selecting energy-absorbing materials by their rebound characteristics as tested below. The rebound test is hereinafter called the "Standard Rebound Test" and consists of dropping a ½″ diameter steel ball (weight 10.78 grams) onto a ½″ thick specimen from a height of 69½" and measuring the resulting "Standard Rebound" in inches. The temperature at which the rebound is a minimum is called the "Minimum Rebound Temperature."

In order to be useful in the present invention, each separate energy-absorbing layer should have a Standard Rebound of less than about 2 inches at its Minimum Rebound Temperature. As can be seen in FIG. 1 there are four basic portions of the rebound spectra, the glass transition region A, the low-rebound region B, the rubbery region C, and region D of viscous flow. Low-rebound is apparent within the region of viscous flow, but within this region the material has a very low Shore A Durometer (less than 20), has little strength and could not be considered a structural material. In general, the Minimum Rebound Temperature of a polyvinyl chloride-plasticizer mixture will vary as a linear function of the weight percent plasticizer, the higher the plasticizer content, the lower the Minimum Rebound Temperature.

Generally, the Minimum Rebound Temperature is determined by the mobility of the extender (plasticizer) at that temperature. In tests of twenty-four different plasticizers, when mixed in equal portions with polyvinyl chloride, the majority had viscosities ranging from 50 to 150 centipoises at the Minimum Rebound Temperatures. With highly extended (e.g. greater than 50 percent extender) epoxy systems, the Minimum Rebound Temperature is roughly proportional to the square root of the extender viscosity at the "Minimum Rebound Temperature." These viscosity relationships are not meant to be stringent guides but only to give an idea of working relationships.

The preferred method of selecting low-rebound formulations is by measuring the low-rebound characteristics of the materials involved. Subsequently, all one needs to do to prepare an energy-absorbing laminate is to select compositions having low-rebound within the desired temperature range and to mount these layers together in superposed relation.

Figure 2:
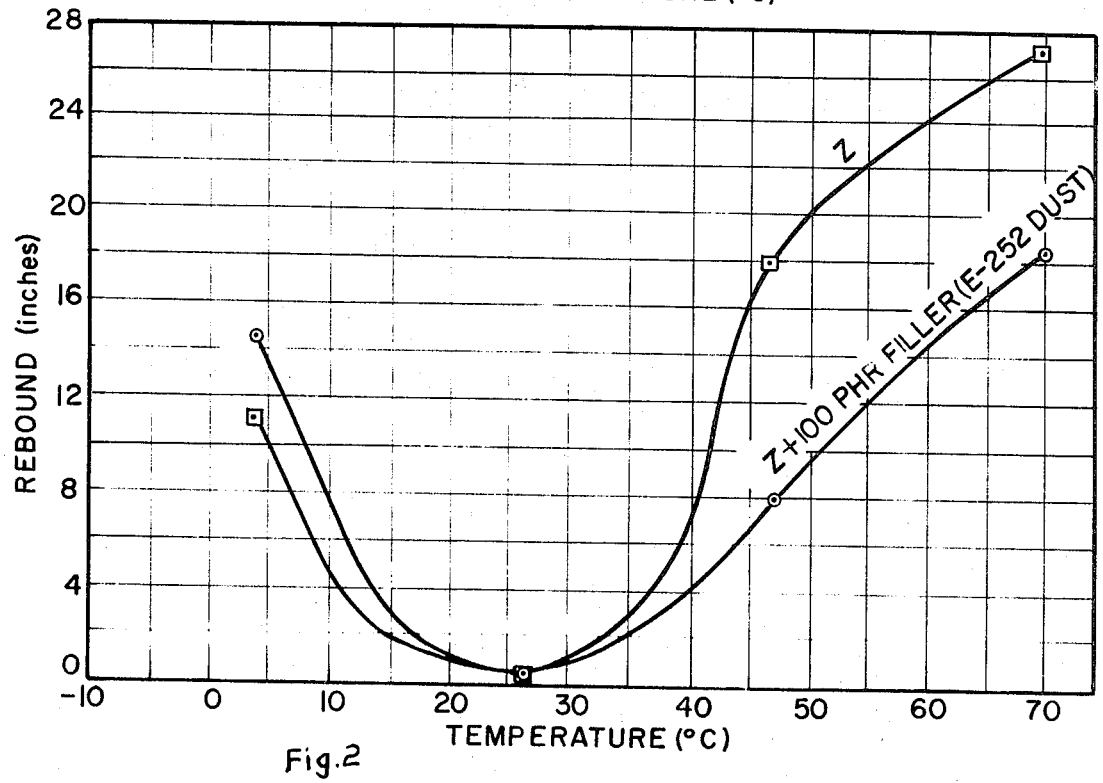
FIG. 2 is a chart similar to FIG. 1 showing the effect of rebound at various temperatures with the addition of a filler to a polyvinyl chloride plasticizer mixture.

A filler, such as a fine aluminum dust, can be utilized to reduce the rebound at temperatures above the Minimum Rebound Temperature (FIG. 2). Such a filler may also be utilized to modify the Shore A Durometer of each of the laminate layers so as to have each low-rebound layer softest at its particular Minimum Rebound Temperature. This increases the shear on that particular layer and can add to the efficiency of the system. When a composite material is formed of a number of different layers having different Minimum Rebound Temperatures, the Standard Rebound of the composite material will not be quite as low as the minimum rebound of that layer having the minimum rebound at the temperature at which the Standard Rebound Test is conducted. However, the Standard Rebound will be less than the average rebound of all of the layers at the temperature at which the rebound is measured. Accordingly, one layer having a rebound of about 2 inches at its Minimum Rebound Temperature of $-10°$ C. will provide a composite Standard Rebound of less than about 6 inches, even though the layer is combined with several other layers having a Standard Rebound on the order of 10 inches or more at $-10°$ C. This unique property of the composite structure is more readily demonstrated as a result of a consideration of the example set forth below.

EXAMPLE

A plurality of laminate formulations was prepared wherein the parts by weight of the various ingredients are set forth in the following Table I. The specific trademarked materials are described by the manufacturer as follows:

Plastolein 9058 DOZ is a di-z-ethylhexyl azelate plasticizer manufactured by Emery Industries having a viscosity at 100° F. of 10 centipoises.

Admex 522 is a low-viscosity polyester type primary plasticizer sold by A.D.M. Chemicals Company.

Santicizer 141 is 2-ethylhexyl diphenyl phosphate nontoxic plasticizer made by Monsanto Company.

Emergy 3461 D is a high molecular weight polyester plasticizer manufactured by Emery Industries having a viscosity of 57,000 cs. at 100° F.

Opalon 440 is a plastisol grade polyvinyl chloride made by Monsanto recommended for plastisols.

Advastab T-150 is an organo tin stabilizer made by Advance Div.-Carlisle Chemical Works, Inc.

Mobilsol 66 is an inert, organic high-boiling aromatic hydrocarbon having alkayl side chains larger than methyl, an initial boiling point in excess of 600° F. and a specific gravity at 60° F. in excess of 1.05. This is sold by the Mobil Oil Company.

E-252 Alumina Dust is a dust obtained from Norton Company having a plurality of particle sizes on the order of $-325$ mesh.

Z-6020 Silane is a trimethoxysilylpropylethylenediamine obtained from Dow Corning Corporation.

The Shore A Durometer as shown in Table I was measured both as an instantaneous reading and after ten seconds using a constant weight loading of 50 grams.

TABLE I

| Compositions | Laminate formulations | | | | |
| --- | --- | --- | --- | --- | --- |
| | L | M | N | O | Z |
| Plastolein 9058 DOZ | 60 | | | | |
| Admex 522 | | 100 | | | |
| Emergy 3461 D | 60 | | | | |
| Santicizer 141 | | | 100 | | |
| Opalon 440 | 100 | 150 | 200 | 85 | 85 |
| Advastab T-150 | .8 | .4 | 2.5 | .6 | .6 |
| Mobilsol 66 | | | 100 | 100 | 100 |
| E-252 Alumina Dust | | | 700 | 185.6 | |
| Z-6020 Silane | | | | .45 | |
| Shore A Durometer Instant/10 seconds | 39/39 | 75/70 | 85/80 | 61/59 | 34/33 |

Referring now to FIG. 3, there are plotted a number of graphs showing the rebound characteristics of the individual layers having formulations L, N, O, and Z of Table I and various combinations of these layers. It is readily apparent from FIG. 3 that any combination of two or more layers has a much wider temperature over which the structure has a rebound of less than about 6, for example. It is also apparent from these curves that the actual rebound of the composite structure at a given temperature is less than the average rebound of all of the layers at such temperature. As can be seen all of the composite structures have a Standard Rebound of less than 6 inches over a temperature range of at least 30° C. and some of the Standard Rebounds are less than 6 inches over a temperature range approaching 60° C.

FIG. 4 shows rebound characteristics of certain multi-laminate compositions O, M and N in Table I. This shows characteristics similar to the characteristics of laminates of FIG. 3 and demonstrates the wide temperature range which can be achieved with Standard Rebounds less than 6 inches. The multi-laminate in FIG. 4 is prepared from a number of the 16 mil layers alternating in the order O, M and N until an approximate thickness of 0.5 inch is obtained. During the test, O was the top layer and N was the bottom layer. In general, there was no difference in test results when N was the top layer with these thin layers.

There may be, in certain situations, some difference in the Standard Rebound at a given temperature, depending upon which layer is struck by the steel ball used in the test. Thus, if the upper surface layer has a relatively high rebound at the temperature of the test, the composite structure may have a somewhat higher rebound than if the order of layers is reversed and a layer having a Minimum Rebound at the test temperature is contacted by the steel ball. However, when the load is uniformly distributed over the composite, such as when the product is used as a shock mount, vibration damper or the like, the relative importance of the order of layers is nowhere near as great.

Similarly, the thickness of the layers can have a considerable effect upon the "Standard Rebound Test," particularly when the upper layer has a relatively high rebound at the test temperature. However, in the case of a distributed load the relative thickness of the layers is not particularly critical.

Since certain changes can be made in the above product without departing from the scope of the invention herein involved, it is intended that all matter contained in the above description shall be interpreted as illustrative and not in a limiting sense.

What is claimed is:

1. An energy absorbing structure formed of at least three layers comprising vinyl chloride polymer mounted in superposed relation, the amount and type of plasticizer being adjusted in each of said layers so that one of said layers has a Minimum Rebound Temperature substantially below room temperature, another of said layers has a Minimum Rebound Temperature in the vicinity of room temperature and a third of said layers has a Minimum Rebound Temperature substantially above room temperature, at least some of said layers having a Standard Rebound at their Minimum Rebound Temperatures of less than about 2 inches, the composite structure having a Standard Rebound of less than about 6 inches over a temperature range of at least 30° C., the structure having an actual Standard Rebound at a given temperature which is less than the average Standard Rebound of all of said layers at said temperature.

2. The structure of claim 1 wherein at least some of said plasticizers in said layers are selected from the group consisting of aromatic esters and aromatic hydrocarbons.

References Cited

UNITED STATES PATENTS

| | | | |
|---|---|---|---|
| 2,748,042 | 5/1956 | Borgese | 161—166X |
| 2,792,321 | 5/1957 | Fredericks | 161—166X |
| 2,981,360 | 4/1961 | Fritze et al. | 181—33.1UX |
| 3,050,426 | 8/1962 | Stevens | 161—166X |
| 3,087,574 | 4/1963 | Watters | 161—166X |
| 3,117,054 | 1/1964 | Antonucci | 161—162X |
| 3,143,457 | 8/1964 | Morris | 181—33.1UX |
| 3,160,549 | 12/1964 | Caldwell et al. | 181—33.01UX |
| 3,169,881 | 2/1965 | Bodine, Jr. | 181—33.01UX |
| 3,249,178 | 5/1966 | Watters | 181—33 |

JOHN T. GOOLKASIAN, Primary Examiner

G. W. MOXON II, Assistant Examiner

U.S. Cl. X.R.

161—254; 181—33; 260—31.8, 33.6